United States Patent
Asada et al.

(10) Patent No.: US 6,760,187 B2
(45) Date of Patent: Jul. 6, 2004

(54) HYDRODYNAMIC BEARING AND DISK APPARATUS

(75) Inventors: Takafumi Asada, Hirakata (JP); Hiroaki Saito, Takatsuki (JP); Hideaki Ohno, Sennan (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 130 days.

(21) Appl. No.: 10/170,752

(22) Filed: Jun. 13, 2002

(65) Prior Publication Data

US 2002/0191333 A1 Dec. 19, 2002

(30) Foreign Application Priority Data

Jun. 13, 2001 (JP) .................................. 2001-178064

(51) Int. Cl.[7] .............................................. G11B 17/02
(52) U.S. Cl. ............................................... 360/99.08
(58) Field of Search ....................... 360/99.08; 384/107

(56) References Cited

U.S. PATENT DOCUMENTS

| 4,892,418 A | * | 1/1990 | Asada et al. ............... 384/124 |
| 5,433,529 A | * | 7/1995 | Hensel ...................... 384/112 |
| 5,504,637 A | * | 4/1996 | Asada et al. ............. 360/98.07 |
| 5,760,509 A | * | 6/1998 | Chung ........................ 310/90 |
| 5,770,906 A | * | 6/1998 | Hazelton et al. ............. 310/90 |
| 5,956,204 A | * | 9/1999 | Dunfield et al. ......... 360/98.07 |

* cited by examiner

Primary Examiner—David Davis
(74) Attorney, Agent, or Firm—Akin Gump Strauss Hauer & Feld, LLP

(57) ABSTRACT

In a hydrodynamic bearing according to the present invention a fixed shaft has different diameter sizes by positions so that overflow or splashing of lubricant out of the apparatus is prevented due to a centrifugal force during high-speed rotation, and lubricant reservoirs are provided in narrower clearances and in wider clearances so that the lubricant is induced to move toward lubricant reservoirs in narrower clearances due to surface tension while the hydrodynamic bearing is in stop, therefore overflow of the lubricant is prevented at the time of starting up.

6 Claims, 7 Drawing Sheets

HYDRODYNAMIC BEARING AND DISK APPARATUS

BACKGROUND OF THE INVENTION

The present invention relates to a hydrodynamic bearing to be used for an apparatus having a rotating mechanism, such as a disk recording/reproducing apparatus for recording and/or reproducing data while rotating a disk at a high speed.

Recently, in a disk recording/reproducing apparatus for recording and/or reproducing data while rotating the disk, the memory size greatly increases and the data transfer speed becomes very high. Therefore, it becomes necessary to provide mechanism for achieving a high speed and high precision rotation force in a rotating mechanism incorporated in such disk recording/reproducing apparatus. Accordingly, a high-speed rotatable hydrodynamic bearing which is constituted so as to support both ends of a main shaft, such as for example described in U.S. Pat. No. 5,504,637, is employed in a rotating mechanism of a disk recording/reproducing apparatus.

A conventional hydrodynamic bearing described in U.S. Pat. No. 5,504,637 is explained hereunder as an example of a prior art with reference to FIG. 10.

FIG. 10 is a cross-sectional view showing a constitution in the vicinity of a main shaft in a conventional hydrodynamic bearing. In FIG. 10, an end portion (lower end portion in the drawing) of a fixed shaft 22 that is the main shaft is fixed to a base member 21. A flange member 23 is fixed in the proximity of the other end portion of the fixed shaft 22. A sleeve 24 and a rotor hub 25 are formed in one integral and is provided rotatable around the fixed shaft 22. An outer circumferential end face of the flange member 23 is disposed inside of a stepped recess 25A formed on the rotor hub 25. A thrust plate 26 is placed so as to confront the upper face of the flange member 23. The thrust plate 26 is fixed to the rotor hub 25 so that the thrust plate 26 can rotate around the fixed shaft 22. Two sets of herringbone-shaped radial hydrodynamic pressure grooves 24A and 24B are formed on the outer circumferential surface of the fixed shaft 22. And, herringbone-shaped thrust hydrodynamic pressure grooves 23A are formed on the upper face of the flange member 23, which is confronting the thrust plate 26. Further on the lower face of the flange member 23, thrust hydrodynamic pressure grooves 23B are provided. The radial hydrodynamic pressure grooves 24A and 24B, as well as thrust hydrodynamic pressure grooves 23A and 23B are filled with lubricant 27.

A rotor magnet 28 is attached to the rotor hub 25 formed in one unified body with the sleeve 24. And, a motor stator 29 is attached to the base member 21 so as to confront the rotor magnet 28.

In FIG. 10, a space shown by reference numeral 22A is a ventilating path, which has a function for discharging air received in a clearance "H" in the proximity of the outer circumferential portion of the flange member 23. A space shown by numeral 24D in FIG. 10 is also a ventilating path for discharging air received in a clearance "J" in the proximity of the lower inner circumferential portion of the flange member 23.

Operations of the conventional hydrodynamic bearing constituted as above are described with reference to FIG. 10.

When power is supplied to the motor stator 29 so that a rotative magnetic field is generated, the rotor magnet 28 starts to rotate along with the rotating members including the rotor hub 25, sleeve 24 and the thrust plate 26, etc. Concurrently, the herringbone-shaped radial hydrodynamic pressure grooves 24A and 24B collect the lubricant toward the central portion thereof. As a result a pressure is generated in a clearance between the outer circumferential surface of the fixed shaft 22 and the inner circumferential surface 24C of the sleeve 24, because the lubricant is squeezed into this clearance by pumping effect. Likewise, a pressure is generated around the herringbone-shaped thrust hydrodynamic pressure grooves 23A and 23B, by the pumping effect to squeeze the lubricant.

By such pressure generated by the lubricant 27, the rotating members around the fixed shaft 22 rotate perfectly in non-contact state with the fixed shaft 22. Consequently disks that are the recording mediums (omitted in the drawing) attached to the rotor hub 25 are driven to rotate together with the sleeve 24. As a result, electric signal is recorded on or reproduced from the disk through a head (omitted in the drawing). Detailed description of operations for recording and reproducing to be performed here is omitted since they are similar to known recording and reproducing processes of a hard disk driving apparatus (HDD).

The conventional hydrodynamic bearing constituted as above has the following disadvantages.

As shown in FIG. 10, the lubricant 27 is applied to the thrust hydrodynamic pressure grooves 23A as well as in the clearance "H" between the outer circumferential end face of the flange member 23 and the inner circumferential surface of the stepped recess 25A. During the hydrodynamic bearing is at rest, the lubricant 27 contained in the clearance "H" moves toward a clearance "G" which is narrower than the clearance "H", due to capillary action. The clearance "G" is located between the inner circumferential surface of the thrust plate 26 and the outer circumferential surface of the fixed shaft 22. The lubricant 27 which has moved into the clearance "G" becomes in a visible state to stand up above the end of the clearance "G", with the lapse of time. When power is supplied to the motor stator 29 and the rotor magnet 28 starts to rotate with the sleeve 24, rotor hub 25 and thrust plate 26 under such a state. At the instant, the lubricant 27 in the clearance "G" instantly became lubricant drops 27a and 27b and splashes out of the hydrodynamic bearing as a result of centrifugal force. In FIG. 10, a mark "RH" shows a distance in a radial direction of the clearance "H" between the outer circumferential end face of the flange member 23 and the inner circumferential surface of the stepped recess 25A. Also a mark "RG" shows a distance in a radial direction of the clearance "G" between the inner circumferential surface of the thrust plate 26 and the outer circumferential surface of the fixed shaft 22. As shown in FIG. 10, the distance "RF" was greater than the distance "RG" (i.e., RH>RG) in a conventional hydrodynamic bearing.

In addition, in the conventional hydrodynamic bearing, the lubricant 27 is applied to the thrust hydrodynamic pressure grooves 23A formed on the flange member 23 as well as to clearances "K" and "L" between the outer circumferential surface of the fixed shaft 22 and the inner circumferential surface of the sleeve 24. Once the rotating members such as the rotor magnet 28, sleeve 24, rotor hub 25 and thrust plate 26, etc. start rotating under such state, the lubricant 27 in the clearance "L" turns into overflow lubricant as a result of centrifugal force and starts to flow out (downward in FIG. 10) of the hydrodynamic bearing. In FIG. 10, a mark "RK" shows a distance in a radial direction of the clearance "K" between the outer circumferential surface of the fixed shaft 22 and the inner circumferential surface of the sleeve 24, and a mark "RL" shows a distance in a radial direction of the clearance "L". As shown in FIG. 10, the distance "RK" was greater than the distance "RL" (i.e., RK>RL) in the conventional hydrodynamic bearing.

As described above, the conventional hydrodynamic bearing has the disadvantage that the lubricant 27 flows out of the clearances "G" or "L", amount of the lubricant 27 decreases, and therefore the lubricant 27 may finally become no longer effective. In addition, since the lubricant 27 splashes out of the apparatus, the lubricant 27 may adhere to other apparatus, thus causing unfavorable effect.

BRIEF SUMMARY OF THE INVENTION

Briefly stated, in one aspect, the present invention is a hydrodynamic bearing comprising a fixed shaft having one end fixed to a base member. A disk-shaped flange member is disposed in the proximity of the other end of said fixed shaft and through a hole of which said fixed shaft is penetrating. Rotating members are disposed so as to enclose said flange member and through which said fixed shaft is penetrating. A motor has a rotor unit attached to one of said rotating members. A stator unit is fixed to said base member so as to confront said rotor unit, wherein at least either of the confronting faces of one of said rotating members and said fixed shaft is provided with radial hydrodynamic pressure grooves. At least either of the confronting faces of said flange member and one of said rotating members is provided with thrust hydrodynamic pressure grooves. Said radial hydrodynamic pressure grooves and said thrust hydrodynamic pressure grooves are filled with lubricant and relations of d1>d2 and 0.2 mm$\leq$d1−d2$\leq$0.8 mm are satisfied. "d1" is a diameter of a central portion where said radial hydrodynamic pressure grooves of said fixed shaft are formed or said radial hydrodynamic pressure grooves of said rotating member are confronted. "d2" is a diameter of the other end portion of said fixed shaft beyond said flange member. A clearance is secured between an outer circumferential surface of the other end portion having a diameter of "d2" and an inner circumferential surface of one of said rotating members confronting said outer circumferential surface.

In another aspect, the present invention is a hydrodynamic bearing comprising a fixed shaft with one end fixed to a base member. A disk-shaped flange member is disposed in the proximity of the other end of said fixed shaft and through a hole of which said fixed shaft is penetrating. Rotating members are disposed so as to enclose said flange member and through which said fixed shaft is penetrating. A motor has a rotor unit attached to one of said rotating members. A stator unit is fixed to said base member so as to confront said rotor unit, wherein at least either of the confronting faces of one of said rotating members and said fixed shaft is provided with radial hydrodynamic pressure grooves. At least either of the confronting faces of said flange member and one of said rotating members is provided with thrust hydrodynamic pressure grooves. Said radial hydrodynamic pressure grooves and said thrust hydrodynamic pressure grooves are filled with lubricant and relations of RA>RB, 0.1 mm$\leq$RA$\leq$0.8 mm and 0.05 mm$\leq$RB$\leq$0.5 mm are satisfied. "RA" is a distance in a radial direction of a clearance between an outer circumferential surface of the other end portion of said fixed shaft beyond said flange member and an inner circumferential surface of one of said rotating members confronting said outer circumferential surface of said other end portion. "RB" is a distance in a radial direction of a clearance between an outer circumferential end face of said flange member and an inner circumferential surface of one of said rotating members confronting said outer circumferential end face.

It will be recognized that some or all of the Figures are schematic representations for purposes of illustration and do not necessarily depict the actual relative sizes or locations of the elements shown.

DETAILED DESCRIPTION OF THE INVENTION

A hydrodynamic bearing and disk recording/reproducing apparatus in accordance with the preferred embodiments of the present invention is described hereunder referring to the accompanying drawings. The disk recording/reproducing apparatus described herein is an apparatus provided with a function of recording data in a disk as a recording medium, and/or reproducing data out of such disk.

First Embodiment

A hydrodynamic bearing, that is a fluid bearing, according to the First embodiment is described referring to FIG. 1 to FIG. 5.

Figure 1:
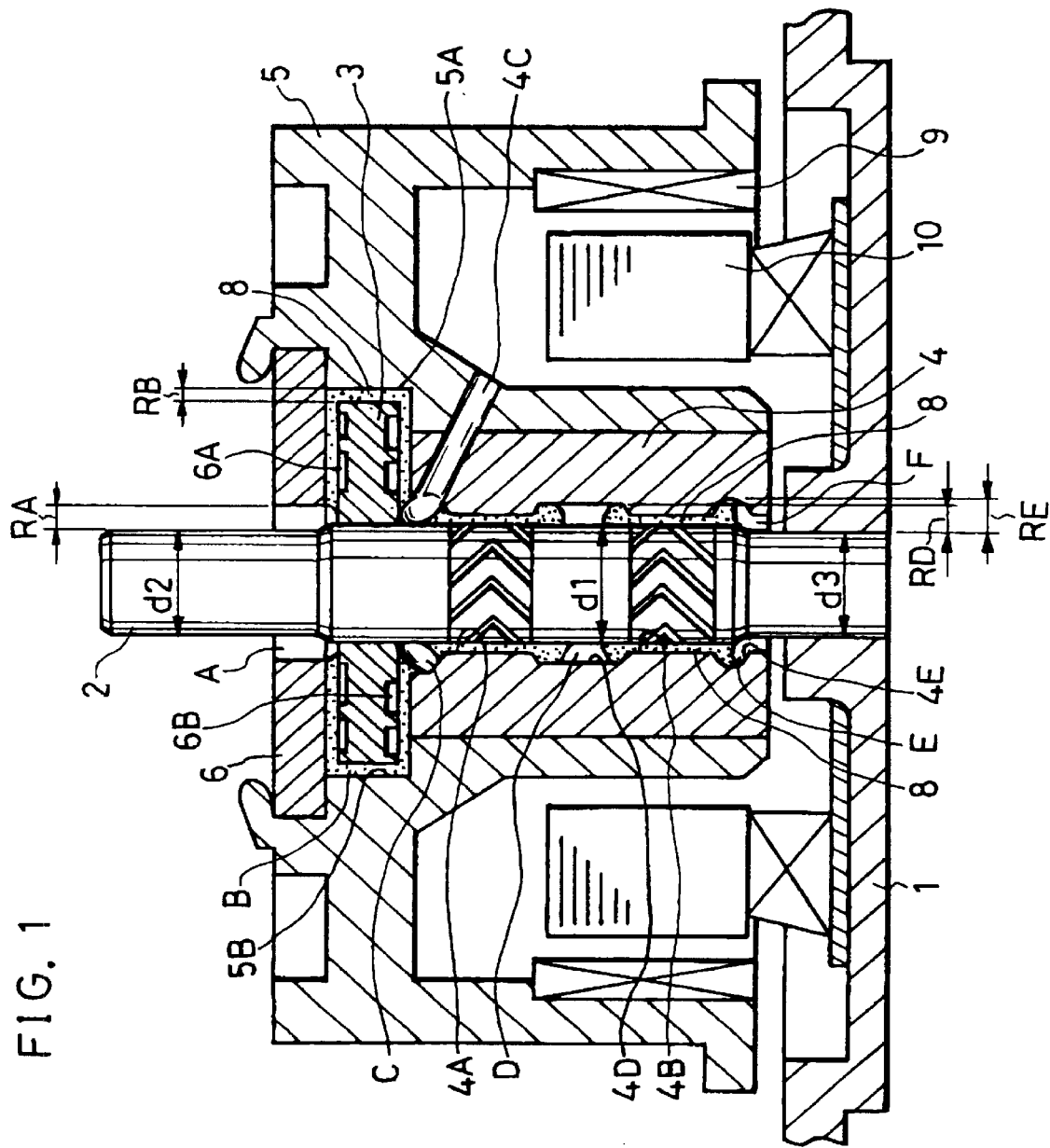
FIG. 1 is a cross-sectional view showing a constitution of a hydrodynamic bearing according to a First embodiment of the present invention.

FIG. 1 is a cross-sectional view showing a constitution of a hydrodynamic bearing according to the First embodiment of the present invention. In FIG. 1, an end (the lower end in the drawing) of a fixed shaft 2, that is the main shaft, is fixed to a base member 1. A flange member 3 is fixed to the fixed shaft 2 in the proximity of the other end thereof. In the First embodiment, the diameter of the fixed shaft 2 is in a range of approx. 1.0 to 15.0 mm. A sleeve 4 and a rotor 5 placed around the fixed shaft 2 are formed in one unified body and are mounted in a rotatable manner. The fixed shaft 2 is placed inside of a bearing bore 4E of the sleeve 4. The outer circumferential end face of the flange member 3 is located inside of a stepped recess 5A of the rotor 5. A thrust plate 6 having a nearly ring shape is located so as to confront the upper face of the flange member 3. The fixed shaft 2 is penetrating through the nearly circular thrust plate 6 at its central portion. The outer circumferential portion of the thrust plate 6 is adhered to the rotor 5, so as to rotate around the fixed shaft 2. A rotor magnet 9 is adhered to the rotor 5 which is united with the sleeve 4. A motor stator 10 is mounted on the base member 1 so as to confront the rotor magnet 9.

In the First embodiment the thrust plate 6 is adhered to the rotor 5, while it is also preferable to form the sleeve 4 so as to enclose the flange member 3 and to adhere the thrust plate 6 to such sleeve 4.

Two sets (upper and lower sets) of nearly herringbone-shaped radial hydrodynamic pressure grooves 4A and 4B are formed on the outer circumferential surface of the fixed shaft 2. In the First embodiment the radial hydrodynamic pressure grooves 4A and 4B are formed on the outer circumferential surface of the fixed shaft 2, while it is also preferable to form the radial hydrodynamic pressure grooves on the inner circumferential surface of the sleeve 4, or on both of the outer circumferential surface of the fixed shaft 2 and the inner circumferential surface of the sleeve 4. Also, two sets of nearly herringbone-shaped patterns are provided in this Embodiment, while it is to be understood that a similar effect can be achieved if at least one group is provided.

The herringbone-shaped thrust hydrodynamic pressure grooves 6A are formed on the upper face of the flange member 3 confronting the thrust plate 6. Also, thrust hydrodynamic pressure grooves 6B are formed on the lower face of the flange member 3. Here, the groove pattern of the thrust hydrodynamic pressure grooves 6A can also be a spiral pattern.

The radial hydrodynamic pressure grooves 4A and 4B and the thrust hydrodynamic pressure grooves 6A and 6B are filled with lubricant 8.

In FIG. 1, a space shown by reference numeral 4C is a ventilating path, for discharging air received in an air chamber or a lubricant reservoir (a clearance shown by a mark "C") that is a space in the proximity of the lower inner circumferential portion of the flange member 3. A space shown by a mark "D" in FIG. 1 is a larger diameter portion in the bearing bore 4E of the sleeve 4, confronting a portion between the upper and lower radial hydrodynamic pressure grooves 4A and 4B. This clearance "D" serves as an air chamber or a lubricant reservoir. Also, a clearance shown by a mark "E" in FIG. 1 is located at a lower position than the lower radial hydrodynamic pressure grooves 4B, in the bearing bore 4E of the sleeve 4. This clearance "E" is a space located closer to the base member 1 in the bearing bore 4E of the sleeve 4, serving as a lubricant reservoir.

Operations of the hydrodynamic bearing of the First embodiment constituted aids above are described referring to FIG. 1.

When power is supplied to the motor stator 10 to generate a rotative magnetic field. The rotor magnet 9 starts to rotate along with the rotating members including the sleeve 4, rotor 5, thrust plate 6, etc. Concurrently, the herringbone-shaped radial hydrodynamic pressure grooves 4A and 4B collect the lubricant 8 toward the central portion thereof. Therefore, the lubricant B is squeezed into the clearance between the outer circumferential surface of the fixed shaft 2 also the inner circumferential surface of the sleeve 4 due to pumping effect, thus generating a pressure in the clearance. Meanwhile, a pressure is generated around the nearly herringbone-shaped thrust hydrodynamic pressure grooves 6A and 6B, since the lubricant 8 is collected into the clearance between the upper face of the flange member 3 and the lower face of the thrust plate 6, as well as between the lower face of the flange member 3 and the upper face of the sleeve 4 etc.

By such pressure generated by the lubricant 8, the rotating members around the fixed shaft 2 rotate in a complete non-contact state with the fixed shaft 2. Consequently a disk that is the recording medium (omitted in the drawing) attached to the rotor 5 is driven to rotate together with the sleeve 4.

In a disk recording/reproducing apparatus according to the First embodiment, the hydrodynamic bearing is constituted so that the lubricant 8 does not overflow out of the clearance "A" (in FIG. 1) located inside of the thrust plate 6 during high-speed rotation of a disk. The reason is described here below. In the following explanation, the clearance "A" (in FIG. 1) refers to an annular space formed between the outer circumferential surface of the fixed shaft 2 and the inner circumferential surface of the thrust plate 6, and the distance "RA" refers to a distance in a radial direction of the space referred to as clearance "A". Also the clearance "B" refers to an annular space formed between the outer circumferential surface of the thrust plate 6 and the inner circumferential surface 5B of a stepped recess 5A of the rotor 5, and the distance "RB" refers to a distance in a radial direction of the space referred to as clearance "B".

In the hydrodynamic bearing according to the First embodiment, the clearance "A" is designed to have dimensions that the lubricant 8 is not lifted by capillary action, and the distance "RA" of the clearance "A" Is greater than the distance "RB" of the clearance "B" (i.e., RA>RB). Also, in the hydrodynamic bearing according to the First embodiment, a diameter "d2" of the upper end portion of the fixed shaft 2 confronting the inner circumferential surface of the thrust plate 6 is smaller than a diameter "d1" of the central portion where the radial hydrodynamic pressure grooves 4A and 4B of the fixed shaft 2 are formed.

In an off state of the hydrodynamic bearing constituted as above according to the First embodiment, the lubricant 8 applied to the thrust hydrodynamic pressure grooves 6A on the thrust plate 6 and to the clearance "B" is retained in the clearance "B" due to capillary action, since the clearance B is narrower than the clearance "A". Consequently, in the hydrodynamic bearing according to the First embodiment intrusion of the lubricant 8 into the clearance "A" is prevented. As a result, since the distance "RA" of the clearance "A" is greater than the distance "RB" of the clearance "BE" (i.e., RA>RB), the lubricant 8 does not overflow out of the hydrodynamic bearing despite that a centrifugal force is imposed when the rotating members suddenly start rotating.

In the off state of the hydrodynamic bearing constituted as above according to the First embodiment, the lubricant 8 applied to the thrust hydrodynamic pressure grooves 6A etc. does not move to the clearance "A" due to capillary action. Even when power is supplied to the motor stator 10 to generate a rotative magnetic field so that the rotor 5 etc. starts rotating, the lubricant 8 is prevented from splashing out of the hydrodynamic bearing.

Further, during high-speed rotation of the hydrodynamic bearing, if the lubricant 8 is in the clearance "A", such lubricant 8 flows toward a larger diameter portion due to a centrifugal force of the rotating unit, such as the thrust plate 6, rotor 5 etc. Then the lubricant 8 flows in radial directions along the surface of the thrust plate 6, finally flowing into the clearance "B". Consequently, the lubricant 8 in the clearance "A" is prevented from overflowing out of the hydrodynamic bearing.

Specific numerical values of some parts are described with reference to the hydrodynamic bearing constituted as above according to the First embodiment.

In the hydrodynamic bearing according to the First embodiment, the distance "RA" of the clearance "A" is in a range of 0.1 mm to 0.8 mm. The distance "RB" of the clearance "B" is in a range of 0.05 mm to 0.5 mm.

Also, the diameter "d2" of the upper end portion of the fixed shaft 2 is smaller than the diameter "d1" of the central portion of the fixed shaft 2. In the First embodiment, the difference (d1−d2) between the diameter "d2" at the upper end portion of the fixed shaft 2 and the diameter "d1" at the central portion is in a range of 0.2 mm to 0.8 mm ((d1−d2)=0.2 mm~0.8 mm).

Results of experiments executed with the hydrodynamic bearing of the First embodiment constituted as above are described with reference to FIG. 2 and FIG. 3.

Figure 2:
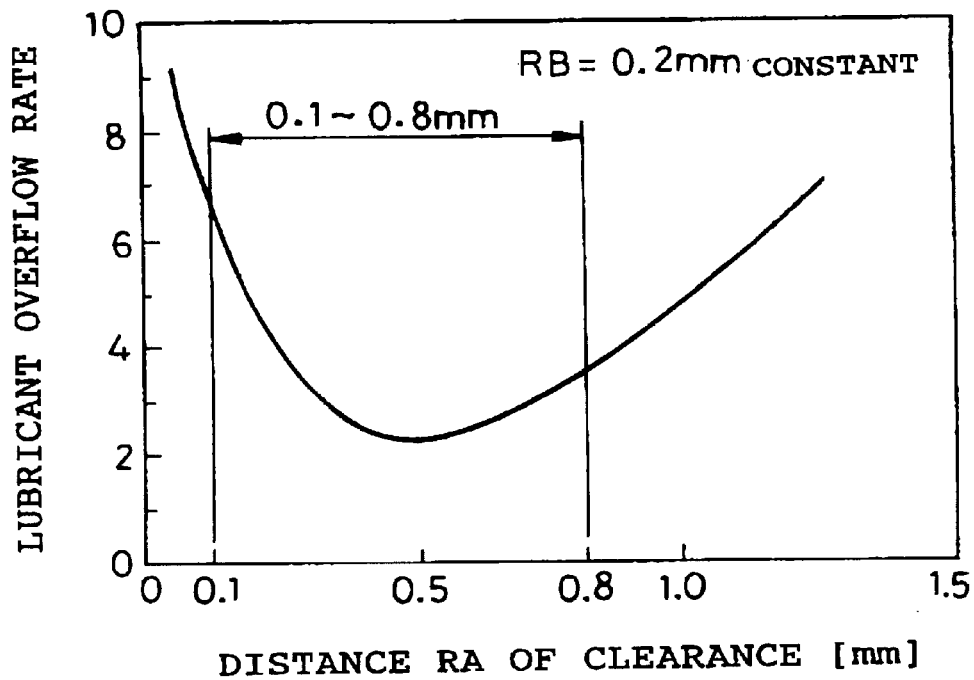
FIG. 2 is a graph showing a relation of clearance distance "RA" and lubricant overflow rate in the hydrodynamic bearing according to the First embodiment.

FIG. 2 is a graph showing variation of overflow rate of the lubricant 8 in relation with changes of the distance "RA" (mm). In FIG. 2, the overflow rate along the ordinate axis reflects variation of quantity of the lubricant 8 remaining within the hydrodynamic bearing, before and after intermittent operations at regular intervals. In the graph of FIG. 2, the distance "RB" of the clearance "B" is maintained at a constant value of 0.2 mm. The overflow rate of the lubricant 8 is defined as decrease of the total quantity of the lubricant per a unit time.

As mentioned above, in the First embodiment the distance "RA" is in a range of 0.1 mm to 0.8 mm, and the distance "RB" is in a range of 0.05 mm to 0.5 mm. Based on the experiments executed by the inventors, when a difference (RA−RB) of the distances is less than 0.1 mm a significant effect has not been obtained. And, in case where such difference is not less than 0.9 mm the distance "RA" itself becomes so great that the lubricant 8 becomes likely to overflow. Consequently, it has proved appropriate to set the difference of the distances (RA−RB) in a range not less than 0.1 mm but less than 0.9 mm, according to the experiment.

Figure 3:
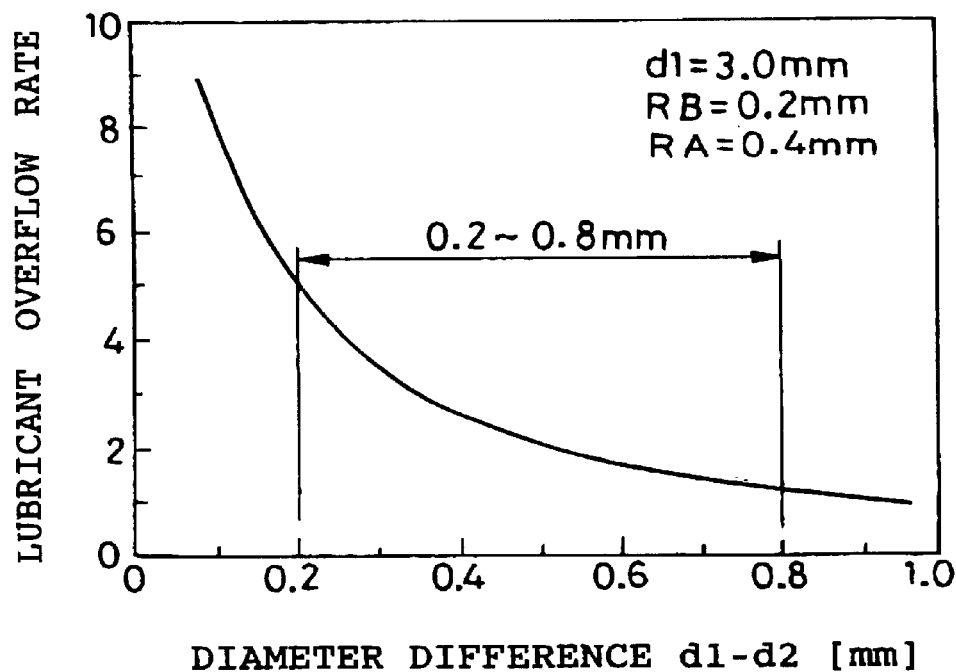
FIG. 3 is a graph showing a relation of diameter difference (d1−d2) of a fixed shaft and lubricant overflow rate in the hydrodynamic bearing according to the First embodiment.

FIG. 3 is a graph showing a variation of overflow rate of the lubricant 8 in relation with changes of difference (d1−d2) between the diameter "d1" of the central portion and the diameter "d2" of the upper end portion of the fixed shaft 2. In FIG. 3, the ordinate axis represents quantity of the lubricant 8 remaining within the hydrodynamic bearing, before and after intermittent operations at regular intervals. In the graph of FIG. 3, the diameter "d1" at a central portion was set at 3.0 mm, the distance RA was 0.4 mm, and the distance RB was 0.2 mm. The overflow rate is defined as decrease of the total quantity of the lubricant per a unit time, in the same way as the case in FIG. 2.

Based on the experiments executed by the inventors, when a difference (d1−d2) of the diameters is 0.1 mm a significant effect has not been obtained. And, in case where such difference is not less than 0.9 mm diameter "d2" of the upper end portion of the fixed shaft 2 has to become so thin that sufficient mechanical rigidity may not be secured. Consequently, it has proved appropriate to set the difference (d1−d2) of the diameters in a range of 0.2 mm to 0.8 mm, according to the experiment. Centrifugal force causes the lubricant 8 within the clearance "A" to flow into the space of the distance "RB" having a greater diameter during high-speed rotation of the hydrodynamic bearing shown in FIG. 1, thus preventing overflow of the lubricant 8.

Further, in a disk recording/reproducing apparatus according to the First embodiment. The hydrodynamic bearing is constituted so that the lubricant 8 does not overflow from a space between the fixed shaft 2 and the lower end portion of the sleeve 4 (the clearance "E" in FIG. 1) during high-speed rotation of a disk. This reason is described below. In the following explanation a clearance "C" refers to a space formed between the outer circumferential surface of the fixed shaft 2 and the upper end portion of the sleeve 4, and disposed directly under the flange member 3. Also, a clearance "D" refers to a space between a recessed inner face of a central portion of the sleeve 4 and the outer circumferential surface of the central portion where the radial hydrodynamic pressure grooves 4A and 4B of the fixed shaft 2 are formed. The distance "RD" of the clearance "D" is a distance in a radial direction of the space of the clearance "D". Further the clearance "E" is formed between the outer circumferential surface of the fixed shaft 2 and the lower end portion of the inner circumferential surface of the sleeve 4, and the distance "RE" is a distance in a radial direction in the space of the clearance "E".

In the hydrodynamic bearing according to the First embodiment, the distance "RD" of the clearance "D" is smaller than the distance "RE" of the clearance "E" (i.e., RD<RE). Also, in the hydrodynamic bearing according to the First embodiment, a diameter "d3" of the lower end portion of the fixed shaft 2 confronting the inner circumferential surface of the lower end portion of the sleeve 4 is smaller than a diameter "d1" of the central portion of the fixed shaft 2 where the radial hydrodynamic pressure grooves 4A and 4B are formed (i.e., d3<d1).

In an off state of the hydrodynamic bearing constituted as above according to the First embodiment, the lubricant 8 applied to a space between the sleeve 4 and the radial hydrodynamic pressure grooves on the fixed shaft 2 is retained in the space of the clearance "D" due to capillary action, since the clearance "D" (the area that serves as an air chamber or lubricant reservoir between two sets of radial hydrodynamic pressure grooves 4A and 4B) is sufficiently narrower than the clearance "E". In other words, since the distance "RE" of the clearance "E" is greater than the distance "RD" of the clearance "D", the lubricant 8 is securely retained in the space of the clearance "D" due to capillary action while the hydrodynamic bearing is stopped, thereby preventing the lubricant 8 from intruding into the clearance "E". In the First embodiment, since the distance RE is greater than the distance RD (i.e., RE>RD), the lubricant 8 is not induced to remain in the clearance "E", and most of the lubricant 8 is retained in the clearance "D". As a result, in the hydrodynamic bearing according to the First embodiment, the lubricant 8 is prevented from overflowing out of the hydrodynamic bearing from the clearance "E" through a clearance "F" even when the rotating members suddenly start rotating. The clearance "F" refers to an opening defined by the outer circumferential surface of the fixed shaft 2 and the lowermost end of the inner circumferential surface of the sleeve 4.

Further, during high-speed rotation of the hydrodynamic bearing, if the lubricant 8 is adhered to the outer circumferential surface of the fixed shaft 2 in the clearance E, such lubricant 8 flows toward a larger diameter portion of the fixed shaft 2 along its outer circumferential surface due to a centrifugal force generated by the rotation. Then the lubricant 8 flows into the clearance D. Consequently, in the hydrodynamic bearing according to the First embodiment, the lubricant 8 adhered to the fixed shaft 2 in the clearance E is prevented from overflowing out of the hydrodynamic bearing through the clearance F.

Specific numerical values of some parts are described with reference to the hydrodynamic bearing constituted as above according to the First embodiment.

In the hydrodynamic bearing according to the First embodiment, the distance "RE" of the clearance "E" is in a range of 0.03 mm to 0.5 mm, and the distance "RD" of the clearance "D" is in a range of 0.02 mm to 0.3 mm.

Also, the diameter "d3" of the lower end portion of the fixed shaft 2 is smaller than the diameter "d1" of the central portion of the fixed shaft 2. In the First embodiment, the difference (d1–d3) between the diameter "d3" at the lower end portion of the fixed shaft 2 and the diameter "d1" at a central portion of the fixed shaft 2 is in a range of 0.2 mm to 0.8 mm.

Figure 4:
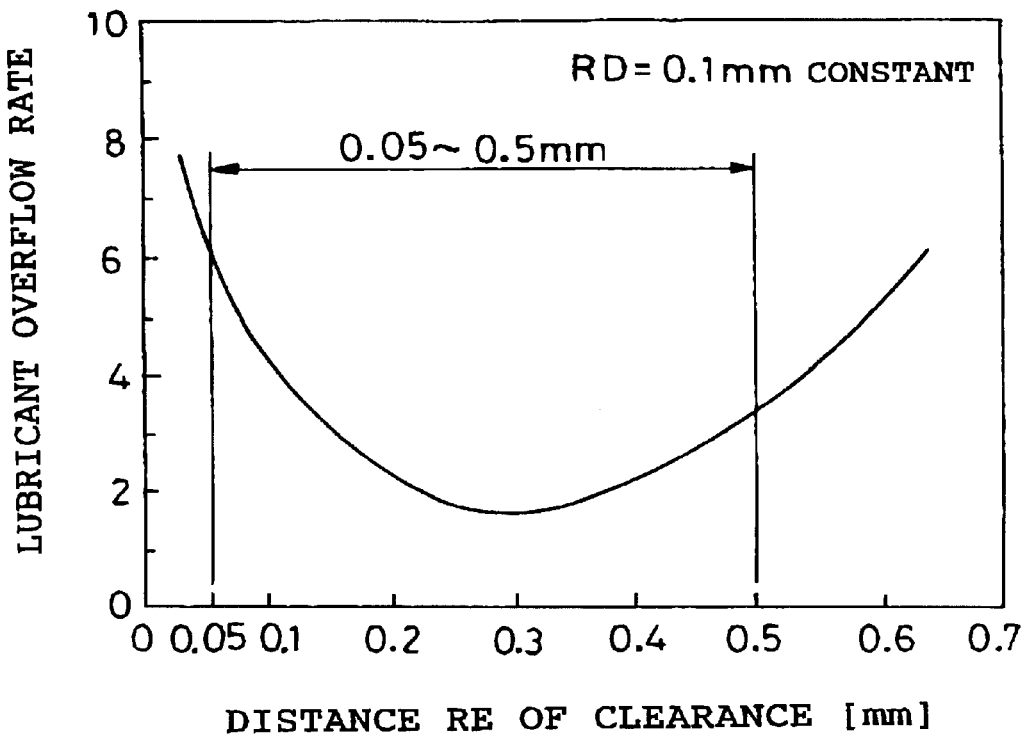
FIG. 4 is a graph showing a relation of clearance distance "RE" and lubricant overflow rate in the hydrodynamic bearing according to the First embodiment.
Figure 5:
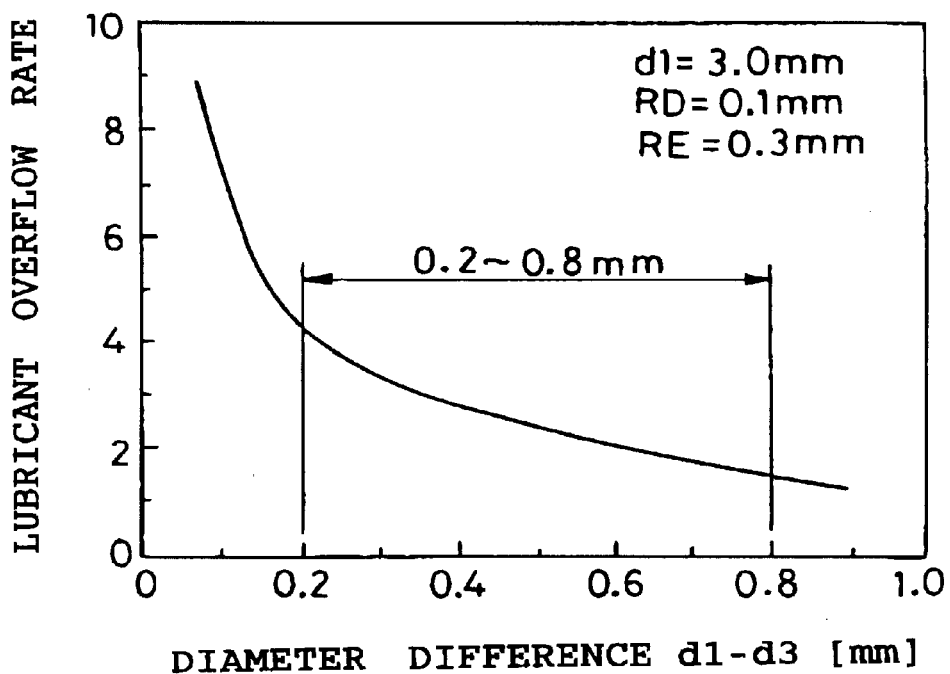
FIG. 5 is a graph showing a relation of diameter difference of the fixed shaft (d1−d3) and lubricant overflow rate in the hydrodynamic bearing according to the First embodiment.

Results of experiments executed with the hydrodynamic bearing of the First embodiment constituted as above are described referring to FIG. 4 and FIG. 5.

FIG. 4 is a graph showing variation of overflow rate of the lubricant 8 in relation with changes of the distance "RE" (mm). In FIG. 4, the overflow rate along the ordinate axis reflects variation of quantity of the lubricant 8 remaining within the hydrodynamic bearing, before and after intermittent operations at regular intervals. In the graph of FIG. 4, the distance "RD" of the clearance "D" was maintained at a constant value of 0.1 mm. The overflow rate of the lubricant 8 is defined as decrease of the total quantity of the lubricant per a unit time.

As mentioned above, in the First embodiment, the distance "RE" is in a range of 0.03 mm to 0.5 mm, and the distance "RD" is in a range of 0.02 mm to 0.3 mm. According to the experiments executed by the inventors, when the distance "RE" of the clearance "E" is less than 0.03 mm, it is possible that the fixed shaft 2 and the sleeve 4 will interfere with each other. On the other hand, when the distance "RE" is not less than 0.6 mm, the clearance "E" becomes so large that the lubricant 8 may flow out through the clearance "F". Therefore, such distance is not preferable either.

FIG. 5 is a graph showing variation of lubricant overflow rate in relation with changes of diameter difference of the fixed shaft 2, between the diameter "d1" of the central portion and the diameter "d3" of the lower end portion. In FIG. 5, the ordinate axis represents quantity of the lubricant 8 remaining within the hydrodynamic bearing, before and after intermittent operations at regular intervals. In the graph of FIG. 5, the diameter "d1" at a central portion was set at 3.0 mm, the distance RD was 0.1 mm, and the distance RE was 0.3 mm. The overflow rate is defined as decrease of the total quantity of the lubricant per a unit time, in the same way as the case of FIG. 4.

According to the experiments executed by the inventors, when a difference (d1–d3) of the diameters is 0.1 mm, a significant effect has not been obtained. And, when difference is not less than 0.9 mm, diameter "d3" of the lower end portion of the fixed shaft 2 becomes thin and insufficiently mechanically rigid. Consequently, it has proved appropriate to set the difference (d1–d3) of the diameters in a range of 0.2 mm to 0.8 mm, according to the experiment. Centrifugal force causes the lubricant 8 within the clearance F to flow into the space of the distance "RE" having a greater diameter during high-speed rotation of the hydrodynamic bearing shown in FIG. 1, due to a centrifugal force, thus preventing overflow of the lubricant 8.

In the First embodiment, a sufficiently wide clearance "C" is created in the space between the lower face of the flange member 3 and the upper radial hydrodynamic pressure grooves 4A. Such clearance "C" serves as an air chamber so that when the volume of air in the clearance "C" changes due to temperature change etc., air is discharged or taken in through the ventilating path 4C. Here, during rotation, the clearance "C" is substantially filled with air, therefore the lubricant 8 does not flow out through the clearance "C". Also, since the connection point of the ventilating path 4C and the clearance "C" is not blocked by the lubricant 8, there is no likelihood that the lubricant 8 flows out through the ventilating path 4C.

Further, in the First embodiment, the thrust plate 6 is fixed to the rotor 5 or the sleeve 4 by caulking or using-adhesive or screws, and joint portions are completely sealed. Therefore the lubricant 8 does not overflow through the joint portions even during high-speed rotation.

According to the foregoing constitution of the First embodiment, none of the lubricant 8 flows out of the hydrodynamic bearing during high-speed rotation, when the hydrodynamic bearing is stopped, or when pressure or temperature has changed. Therefore, in this way, a highly reliable fluid bearing, specifically a hydrodynamic bearing, can be accomplished.

Second Embodiment

Figure 6:
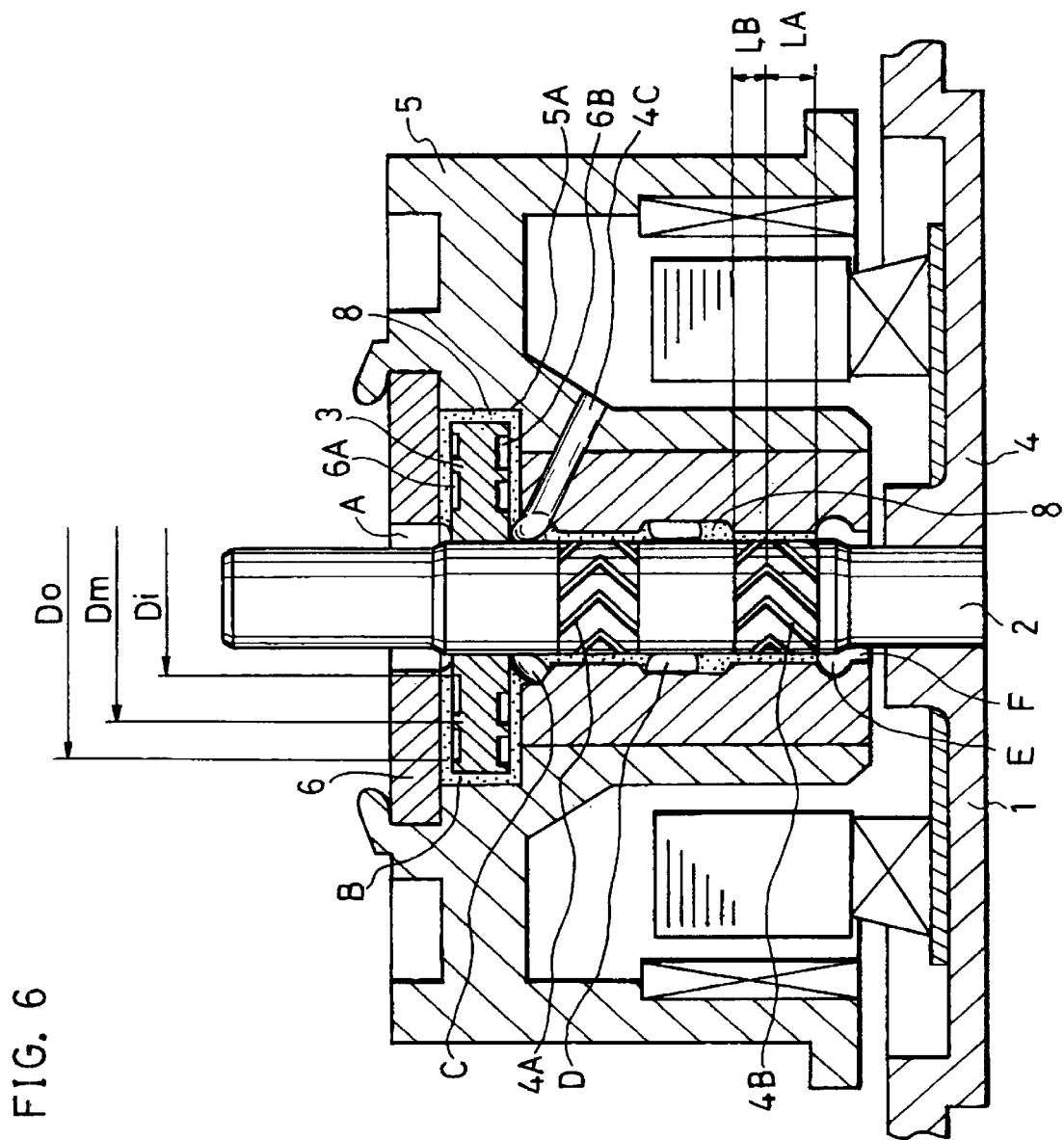
FIG. 6 is a cross-sectional view showing a constitution of a hydrodynamic bearing according to the Second embodiment of the present invention.
Figure 7:
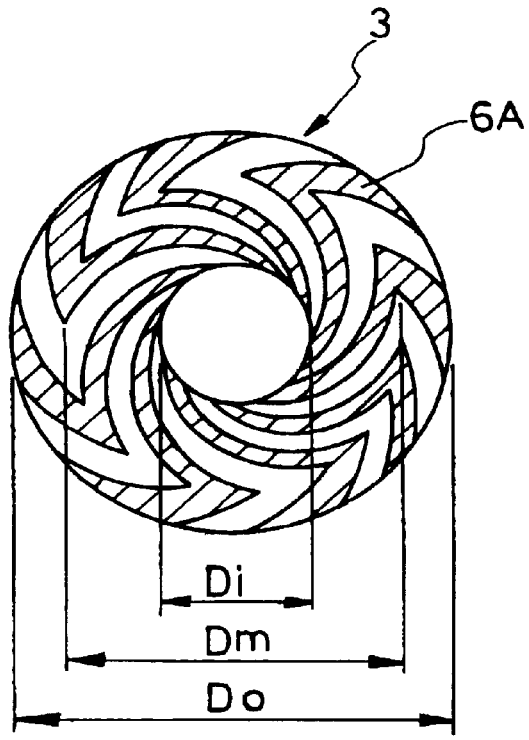
FIG. 7 is a plan view showing one of the patterns of the thrust hydrodynamic pressure grooves in the Second embodiment.
Figure 8:
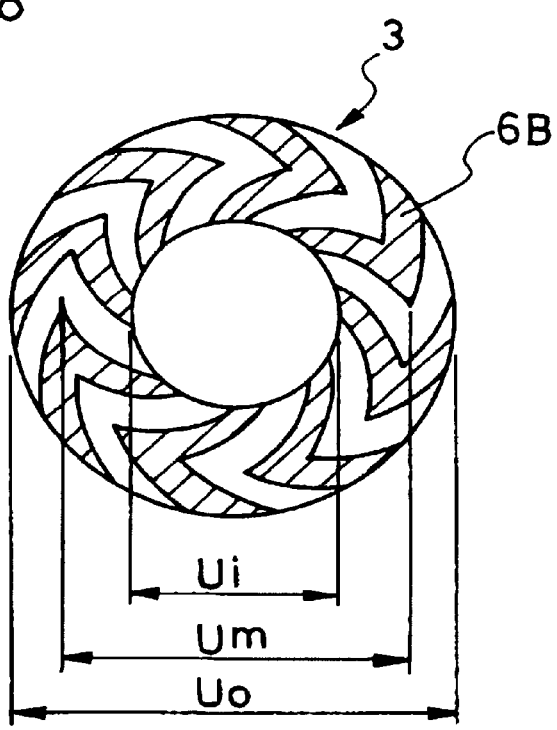
FIG. 8 is a plan view showing the other pattern of the thrust hydrodynamic pressure grooves in the Second embodiment.

A hydrodynamic bearing, that is a fluid bearing, according to the Second embodiment is described referring to FIG. 6 to FIG. 8.

FIG. 6 is a cross-sectional view showing a constitution of a hydrodynamic bearing according to the Second embodiment of the present invention. FIG. 7 and FIG. 8, respectively, show a pattern of the thrust hydrodynamic pressure grooves formed on each face of the flange member. The hydrodynamic bearing according to the Second embodiment comprises substantially the same constitution as that of the hydrodynamic bearing of the foregoing First embodiment. In the hydrodynamic bearing according to the Second embodiment, groove patterns of the thrust hydrodynamic pressure grooves on the flange member and the radial hydrodynamic pressure grooves on the fixed shaft or sleeve are respectively specified in forms. In the Second embodiment, elements essentially identical to those in the hydrodynamic bearing of the foregoing First embodiment are designated by the same reference numerals, and descriptions of such elements are omitted.

In FIG. 6, the lower end of the fixed shaft 2 is fixed to the base member 1, and the proximity of the other end of the fixed shaft 2 is fixed to the flange member 3. The sleeve 4 and rotor 5 placed around the fixed shaft 2 are formed in one unified body, and are mounted in a rotatable manner. The thrust hydrodynamic pressure grooves 6A shown in FIG. 7 are formed on the upper face (the face confronting the thrust plate 6) of the flange member 3, and the thrust hydrodynamic pressure grooves 6B shown in FIG. 8 are formed on the lower face (the face confronting the sleeve 4) of the flange member 3. FIG. 7 and FIG. 8 show the patterns of the thrust hydrodynamic pressure grooves, in which the shadowed portions are the grooves. Meanwhile, the nearly herringbone-shaped hydrodynamic pressure grooves on the fixed shaft 2 shown in FIG. 6 represent a pattern transferred to a plain surface.

When the reference diameter of the groove pattern of the thrust hydrodynamic pressure grooves 6A on the flange member 3 shown in FIG. 7 is denoted by "Dm", the inner diameter of the groove pattern as "Di" and the outer diameter of the groove pattern as "Do", usually the reference diameter "Dm" is the square root of the average of the square of the diameter "Di" and the square of the diameter "Do". However according to the Second embodiment of the present invention, the reference diameter "Dm" of the groove pattern is 0.2 mm greater than a value obtained by such calculation. In other words, the reference diameter Dm of the groove pattern of the thrust hydrodynamic pressure grooves 6A in the Second embodiment is determined by the formula of Dm=√[(Di²+Do²)/2]+α(α=0.2 mm), i.e., Dm= [(Di²+Do²)/2]$^{1/2}$ +α. A result of setting the reference diameter "Dm" greater than the ordinary calculation is that a pumping force is generated that causes the lubricant 8 to flow toward the outer circumferential portion (in a direction toward the clearance "B" of FIG. 6) from an inner portion on the upper face of the flange member 3. Consequently, in the hydrodynamic bearing according to the Second embodiment, the lubricant 8 is prevented from overflowing or splashing out of the clearance "A" of FIG. 6. FIG. 6 also shows the respective positions of the outer diameter "Do", the reference diameter "Dm" and inner the diameter "Di" of the thrust hydrodynamic pressure grooves.

FIG. 8 shows the groove pattern of the thrust hydrodynamic pressure grooves 6B formed on the lower face of the flange member 3. The groove pattern of the thrust hydrodynamic pressure grooves 6B in FIG. 8 is formed on the face confronting the upper end face of the sleeve 4 etc., so that the lubricant 8 flows into this clearance due to pumping effect caused by rotation of the sleeve 4, etc. The inner diameter "Ui", the reference diameter "Urn" and the outer diameter "Uo" of the groove pattern of the thrust hydrodynamic pressure grooves 6B satisfy the ordinary formula, such that no specific flow of the lubricant 8 is caused. In other words, the reference diameter "Um" of the groove pattern of the thrust hydrodynamic pressure grooves 6B in the Second embodiment is determined by the formula of Um=√[(Ui²+Uo²)/2], i.e., Um=[(Ui²+Uo²)/2]$^{1/2}$.

As shown in FIG. 6, the lower radial hydrodynamic pressure grooves 4B on the fixed shaft 2 have a different pattern from the upper radial hydrodynamic pressure grooves 4A. When a distance in a vertical direction of the upper portion of the groove pattern in the lower radial hydrodynamic pressure grooves 4B is denoted by "LB", and a distance in a vertical direction of the lower portion by "LA", the distance "LA" is greater than the distance "LB" (i.e., LA>LB) in the Second embodiment. As a result, in the Second embodiment, since the distance "LB" of the upper portion of the radial hydrodynamic pressure 4B is narrower than the distance "LA" of the lower portion, a pumping force is generated so that the lubricant 8 does not flow out through the lower portion of the fixed shaft 2. In the Second embodiment, a difference (LA−LB) in dimension of the groove pattern of the radial hydrodynamic pressure grooves 4B is in a range of 0.5 mm to 0.8 mm. If such difference (LA−LB) is smaller than 0.5 mm, a sufficient pumping force is not generated. And if the difference (LA−LB) is greater than 0.8 mm, the overall dimensions of the hydrodynamic bearing cannot be made sufficiently compact.

Further, in the Second embodiment, the thrust plate 6 is fixed to the rotor 5 or the sleeve 4 by caulking or using adhesive or screws, and joint positions are completely sealed. Therefore the lubricant 8 does not overflow through the joint positions even during high-speed rotation.

According to the foregoing constitution of the Second embodiment, the lubricant 8 does not overflow from the hydrodynamic bearing during high-speed rotation, when the hydrodynamic bearing is stopped, or when pressure or temperature has changed. Therefore, in this way, a highly reliable fluid bearing, specifically a hydrodynamic bearing, can be accomplished.

Third Embodiment

Figure 9:
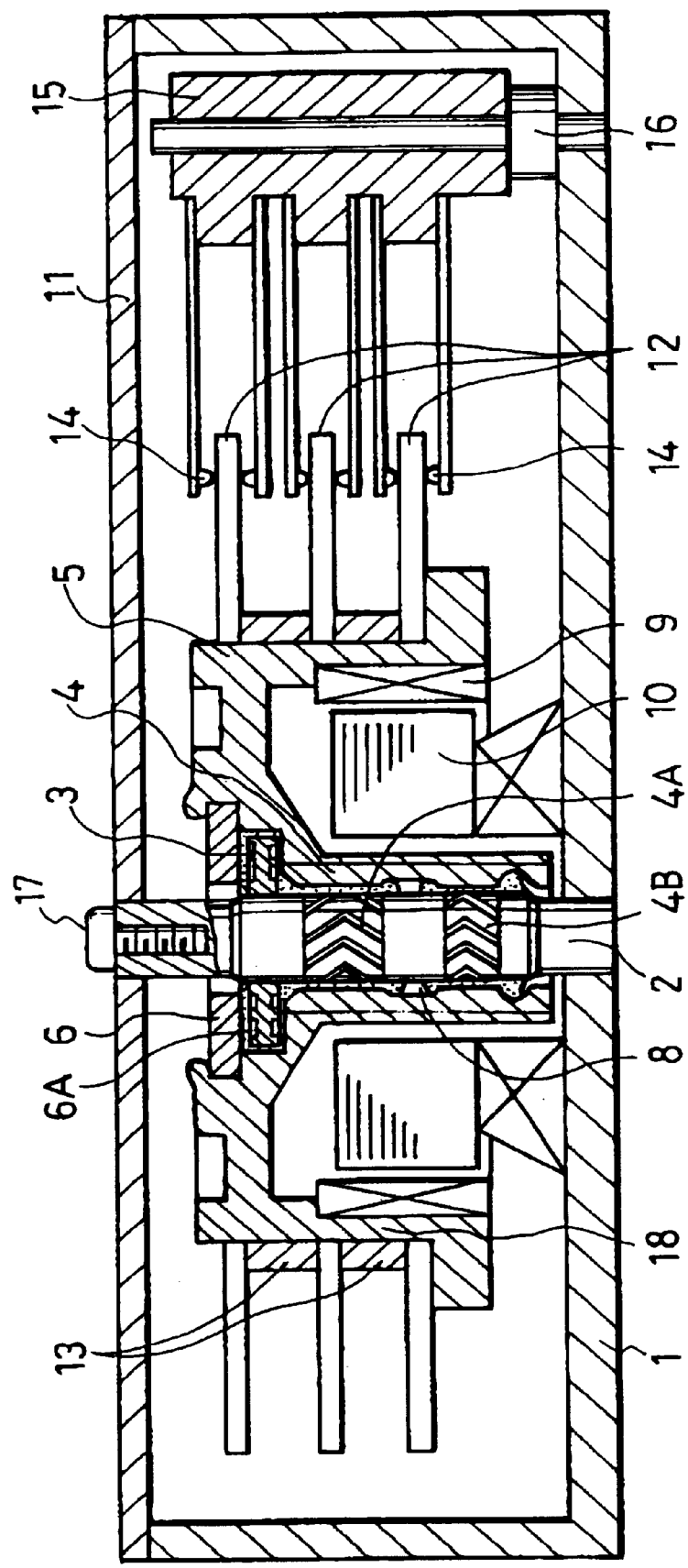
FIG. 9 is a cross-sectional view showing a constitution of a disk recording/reproducing apparatus according to the Third embodiment of the present invention.
Figure 10:
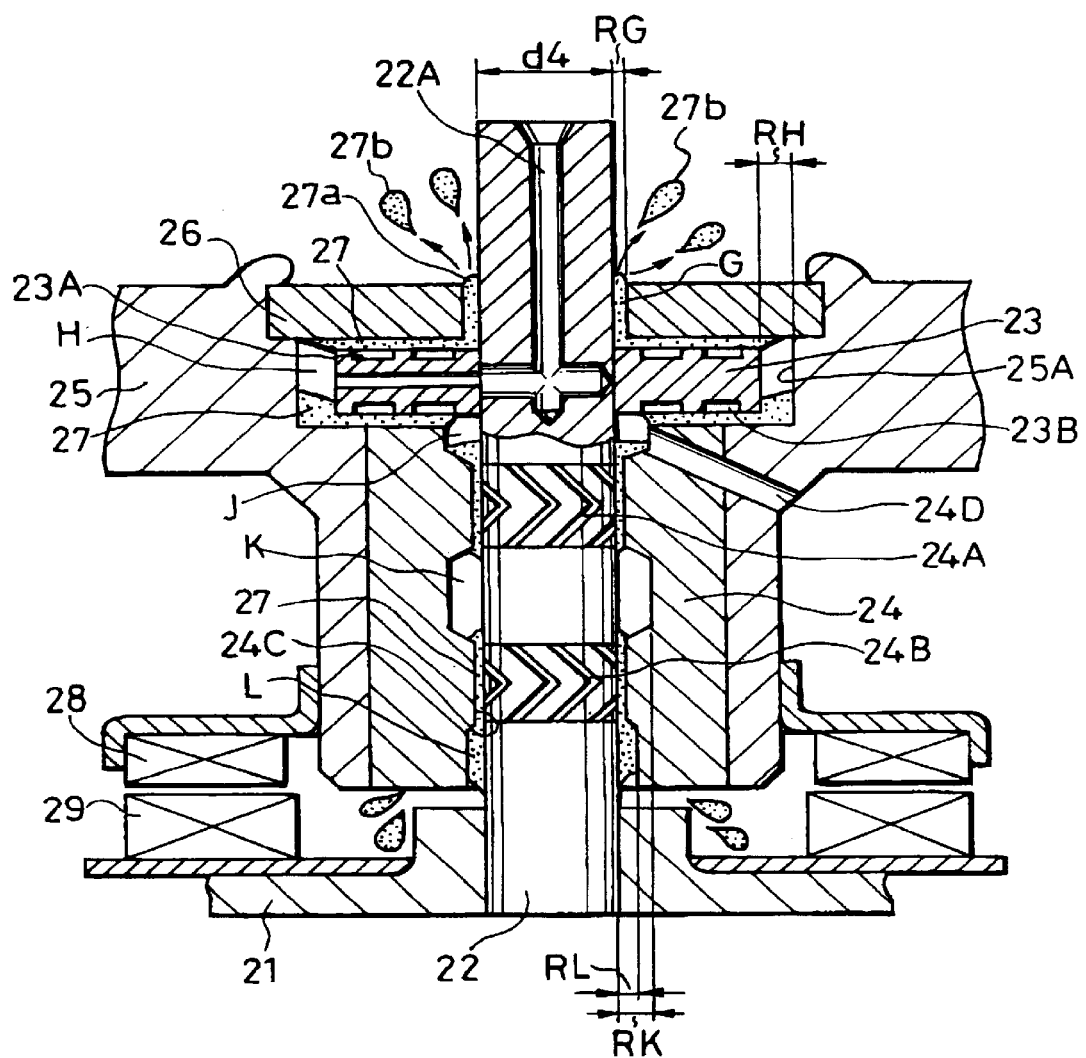
FIG. 10 is the cross-sectional view showing the constitution of the conventional hydrodynamic bearing.

A disk recording/reproducing apparatus according to the Third embodiment of the present invention is described referring to the accompanying FIG. 9.

FIG. 9 is a cross-sectional view showing a constitution of a disk recording/reproducing apparatus according to the Third embodiment of the present invention. The disk recording/reproducing apparatus according to the Third embodiment is a disk recording/reproducing apparatus in which the hydrodynamic bearing according to the First embodiment and the Second embodiment is incorporated as a rotating mechanism. Therefore referring to the hydrodynamic bearing in the disk recording/reproducing apparatus according to the Third embodiment, elements essentially identical to those in the First embodiment and the Second embodiment are designated by the same reference numerals, and descriptions of such elements are omitted. Further, the disk recording/reproducing apparatus described herein is an apparatus provided with a function of recording data in a disk that is a recording medium, and/or reproducing data out of such disk.

In FIG. 9, an end (the lower end in FIG. 9) of the fixed shaft 2, that is the main shaft, is fixed to a base member 1. The proximity of the other end of the fixed shaft 2 is fixed to the flange member 3. The sleeve 4 and the rotor 5 placed around the fixed shaft 2 are formed in one unified body and are mounted in a rotatable manner. The fixed shaft 2 is placed inside of the sleeve 4 with a predetermined clearance therebetween. The flange member 3 is located inside of a stepped recess of the rotor 5. The thrust plate 6 having a nearly ring shape is located so as to confront the upper face of the flange member 3. The fixed shaft 2 is penetrating through the nearly circular thrust plate 6 at its central portion. The outer circumferential portion of the thrust plate 6 is adhered to the rotor 5, so as to rotate around the fixed shaft 2. The rotor magnet 9 is adhered to the rotor 5 that is united with the sleeve 4. Meanwhile the motor stator 10 is mounted on the base member 1 so as to confront the rotor magnet 9.

A plurality of disks 12 are attached to the rotor 5. Spacers 13 are placed between the disks to maintain a predetermined interval. A plurality of heads 14 supported by a collar 15 are disposed against the disks 12 so that recording/reproducing can be performed. The collar 15 is designed to rotate around a supporting shaft 16 fixed to the base member 1. The base member 1 that encloses the disk recording/reproducing mechanism is provided with an upper cover 11 for protecting the components installed inside. The upper end portion of the fixed shaft 2 is fixed to the upper cover 11 with means for fixing 17, for example a screw and nut, thus enforcing the total structure.

In the Third embodiment, the thrust plate 6 is adhered to the rotor 5, while it is also preferable to form the sleeve 4 so as to enclose the flange member 3 and to adhere the thrust plate 6 to such sleeve 4.

Operations of the disk recording/reproducing apparatus of the Third embodiment constituted as above are described referring to FIG. 9.

When power is supplied to the motor stator 10 to generate a rotative magnetic field, the rotor magnet 9 starts to rotate along with the rotating members including the sleeve 4, rotor 5, thrust plate 6, disks 12, spacers 13, etc. Concurrently, the nearly herringbone-shaped radial hydrodynamic pressure grooves 4A and 4B and the thrust hydrodynamic pressure grooves 6A and 6B respectively collect the lubricant 8 toward the central portion thereof. Therefore the lubricant 8 is squeezed into the clearance between the outer circumferential surface of the fixed shaft 2 and the inner circumferential surface of the sleeve 4, between the flange member 3 and the thrust plate 6, between the flange member 3 and the upper end face of the sleeve 4 etc. due to pumping effect, thus generating a pressure in the clearance.

By such pressure generated by the lubricant 8, the rotating members around the fixed shaft 2 rotate in a complete non-contact state with the fixed shaft 2. As a result, the disks 12 rotate precisely at a constant speed. And a signal is recorded in and reproduced from the rotating disk through the heads 14 supported in a rotatable manner by the supporting shaft 16 and the collar 15.

The disk recording/reproducing apparatus of the Third embodiment constituted as above achieves a rotation in a higher precision. Therefore, a combination of the hydrodynamic bearing that prevents overflow of the lubricant 8 and the disk recording/reproducing apparatus offers an enormous advantage to the relevant industrial fields. Also, the disk recording/reproducing apparatus of the Third embodiment achieves a remarkable increase in recording density, and assures a higher reliability of the disk recording/reproducing apparatus over a longer period of time, resulting in a more extensive application to various kinds of computers etc.

As described in the foregoing explanation, the hydrodynamic bearing according to the present invention is provided with the fixed shaft 2 that has different diameter sizes by positions. Therefore, overflow of the lubricant 8 is prevented due to a centrifugal force generated around the fixed shaft 2 during high-speed rotation. Also in the hydrodynamic bearing according to the present invention, lubricant reservoirs in wider clearances and those in narrower clearances are located at prescribed positions, so that the lubricant 8 is induced to move toward lubricant reservoirs in narrower clearances due to surface tension while the hydrodynamic bearing is stopped. As a result, the lubricant 8 does not flow out of the openings at start up. Further incorporating the hydrodynamic bearing as constituted above in a disk recording/reproducing apparatus provides a disk recording/reproducing apparatus of a higher quality that performs high-speed rotation in a higher precision, and prevents overflow of the lubricant 8 over a long period of time.

Furthermore, the foregoing Embodiments describe a disk recording/reproducing apparatus that records and reproduces a data in and out of a disk that is the recording medium, however it is to be understood that the disk recording/reproducing apparatus implies a disk recording apparatus for only recording a data in the disk that is the recording medium, as well as a disk reproducing apparatus for only reproducing information contained in the disk.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A hydrodynamic bearing comprising:
   a fixed shaft having one end fixed to a base member;
   a disk-shaped flange member disposed in the proximity of the other end of said fixed shaft and through a hole of which said fixed shaft is penetrating;
   rotating members disposed so as to enclose said flange member and through which said fixed shaft is penetrating; and
   a motor having:
      a rotor unit attached to one of said rotating members; and
      a stator unit fixed to said base member so as to confront said rotor unit, wherein at least either of the confronting faces of one of said rotating members and said fixed shaft is provided with radial hydrodynamic pressure grooves, at least either of the confronting faces of said flange member and one of said rotating members is provided with thrust hydrodynamic pressure grooves, said radial hydrodynamic pressure grooves and said thrust hydrodynamic pressure grooves are filled with lubricant, relations of $d1<d2$ and $0.2 \text{ mm} \leq d1-d2 \leq 0.8 \text{ mm}$ are satisfied, where "$d1$" is a diameter of a central portion where said radial hydrodynamic pressure grooves of said fixed shaft are formed or said radial hydrodynamic pressure grooves of said rotating member are confronted, and "$d2$" is a diameter of the other end portion of said fixed shaft beyond said flange member, and a clearance is secured between an outer circumferential surface of the other end portion having a diameter of "$d2$" and an inner circumferential surface of one of said rotating members confronting said outer circumferential surface.

2. The hydrodynamic bearing according to claim 1, wherein a relation of $0.2 \text{ mm} \leq (d1-d3) \leq 0.8 \text{ mm}$ is satisfied, where "$d3$" is a diameter of a base side end portion of said fixed shaft fixed to said base member; and a clearance is secured between an outer circumferential surface of said base side end portion and an inner circumferential surface of one of said rotating members confronting said outer circumferential surface of the base side end portion.

3. The hydrodynamic bearing according to claim 1, wherein a stepped portion of said fixed shaft is located in the proximity of said flange member.

4. The hydrodynamic bearing according to claim 2, wherein a stepped portion of said fixed shaft is located in the proximity of said inner circumferential surface of one of said rotating members confronting said outer circumferential surface of said base side end portion fixed to said base member.

5. A hydrodynamic bearing comprising:
   a fixed shaft with one end fixed to a base member;
   a disk-shaped flange member disposed in the proximity of the other end of said fixed shaft and through a hole of which said fixed shaft is penetrating;
   rotating members disposed so as to enclose said flange member and through which said fixed shaft is penetrating; and
   a motor having:
      a rotor unit attached to one of said rotating members; and
      a stator unit fixed to said base member so as to confront said rotor unit, wherein at least either of the confronting faces of one of said rotating members and said fixed shaft is provided with radial hydrodynamic pressure grooves, at least either of the confronting faces of said flange member and one of said rotating members is provided with thrust hydrodynamic pressure grooves, said radial hydrodynamic pressure grooves and said thrust hydrodynamic pressure grooves are filled with lubricant, and relations of $RA>RB$, $0.1 \text{ mm} \leq RA \leq 0.8 \text{ mm}$ and $0.05 \text{ mm} \leq RB \leq 0.5 \text{ mm}$ are satisfied, where "$RA$" is a distance in a radial direction of a clearance between an outer circumferential surface of the other end portion of said fixed shaft beyond said flange member and an inner circumferential surface of one of said rotating members confronting said outer circumferential surface of said other end portion, and "RB" is a distance in a radial direction of a clearance between an outer circumferential end face of said flange member and an inner circumferential surface of one of said rotating members confronting said outer circumferential end face.

6. The hydrodynamic bearing according to claim 5, wherein a plurality of sets of radial hydrodynamic pressure grooves are provided; the first lubricant reservoir is located between said sets of radial hydrodynamic pressure grooves; the second lubricant reservoir is located beyond said sets of radical hydrodynamic pressure grooves in a direction toward said base member; and relations of RE>RD, 0.03 mm$\leq$RE$\leq$0.5 mm and 0.02 mm$\leq$RD$\leq$0.3 mill are satisfied, where "RD" is a distance in a radial direction between said fixed shaft and one of said rotating members where said first lubricant reservoir is located, and "RE" is a distance in a radial direction between said fixed shaft and one of said rotating members where said second lubricant reservoir is located.

* * * * *